(12) United States Patent
Tuckey (10) Patent No.: US 6,213,726 B1
(45) Date of Patent: Apr. 10, 2001

(54) FUEL PUMP MODULE

(75) Inventor: Charles H. Tuckey, Sand Point, MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/412,084

(22) Filed: Oct. 4, 1999

Related U.S. Application Data (63) Continuation-in-part of application No. 08/987,125, filed on Dec. 8, 1997, now Pat. No. 5,960,775.

(51) Int. Cl.[7] .................................................. F04B 23/08
(52) U.S. Cl. .......................................................... 417/199.1
(58) Field of Search ........................ 417/199.1; 123/509, 123/510, 511; 137/574, 572, 576, 565, 113; 210/411, 416

(56) References Cited

U.S. PATENT DOCUMENTS 3,575,296 * 4/1971 Peterson ............................... 210/416
4,190,532 * 2/1980 Halbfoster ............................. 210/75
5,392,750    2/1995 Laue et al. .
5,564,396   10/1996 Kleppner et al. .
5,699,773   12/1997 Kleppner et al. .
5,779,900 *  7/1998 Holm et al. .......................... 210/411
5,860,796    1/1999 Clausen .

* cited by examiner

Primary Examiner—Teresa Walberg
Assistant Examiner—Daniel Robinson
(74) Attorney, Agent, or Firm—Reising, Ethington, Barnes, Kisselle, Learman & McCulloch, P.C.

(57) ABSTRACT

A fuel pump module disposed within a vehicle fuel tank has a fuel pump therein to draw fuel from the fuel tank and deliver that fuel under pressure to the vehicle engine, and a jet pump driven by the fuel pump to lower the pressure within the module to draw fuel from the fuel tank through a filtered inlet of the module when the fuel pump is operating. When the fuel pump is not operating, such as when the vehicle is not in use, the jet pump ceases to operate and the pressure within the module returns to that of the fuel tank. When the level of fuel in the fuel tank is lower than that within the fuel pump module and the pump is turned off, a portion of the fuel within the module returns to the fuel tank, through the filtered inlet of the module thereby dislodging at least some of the contaminants trapped by the filter.

22 Claims, 5 Drawing Sheets

FUEL PUMP MODULE

REFERENCE TO COPENDING PATENT APPLICATION

This application is a continuation-in-part of U.S. Ser. No. 08/987,125 filed Dec. 8, 1997 now U.S. Pat. No. 5,960,775.

FIELD OF THE INVENTION

This invention relates generally to a vehicle fuel delivery system and more particularly to a fuel pump module constructed to be disposed within a vehicle fuel tank.

BACKGROUND OF THE INVENTION

Some fuel delivery systems utilize an electric fuel pump disposed within a vehicle fuel tank to draw fuel from the fuel tank and deliver that fuel under pressure to the vehicles engine. Contaminants within the fuel tank, such as weld slag or other residual materials from the manufacturing of the fuel tank as well as contaminants added to the tank during its use, can damage the fuel pump if allowed to enter therein and severely effect the durability and reliability of the fuel pump. To prevent at least the most harmful contaminants from entering the fuel pump, fuel filters of various materials have been disposed adjacent to the fuel pump inlet to trap these contaminants. These fuel filters are generally relatively small in size and located directly adjacent and attached to the fuel pump inlet.

In use, fuel flows in one direction through the fuel filter and the contaminants trapped by the filter clog the pores of the filter material and thereby reduce the fuel flow through the filter. The reduced fuel flow through the filter and into the fuel pump can damage the fuel pump as its strains to draw sufficient fuel through its inlet to supply a sufficient amount of fuel to the vehicle engine. In extreme cases, the fuel filter can become so clogged that insufficient fuel is delivered to the engine severely affecting the performance of the engine.

In addition, increasingly strict governmental regulations are being imposed which limit the allowable escape to the atmosphere of hazardous hydrocarbon fuel vapors. In response to these regulations, many fuel delivery systems for internal combustion engines, such as for automobiles have incorporated fuel vapor management systems including fuel vapor collection canisters disposed some distance from the fuel tank and in communication with a vapor dome in the fuel tank through a vapor vent valve. In at least some of these fuel vapor management systems, a pressure drop created by the operating engine is used to purge fuel vapors from the carbon canister by drawing fuel vapor from the canister into an intake manifold of the engine for combustion within the engine. Thus, carbon canisters have been mounted away from the fuel tank and closer to the vehicle engine to facilitate purging of the fuel vapor from the carbon canister.

SUMMARY OF THE INVENTION

A fuel pump module disposed within a vehicle fuel tank has a fuel pump therein to draw fuel and deliver that fuel under pressure to the vehicle engine, and a secondary low pressure source to lower the pressure within the module to draw fuel from the fuel tank through a filter of the module when the fuel pump and/or the vehicle engine is operating. When the fuel pump and vehicle engine are not operating, such as when the vehicle is not is use, the secondary low pressure source is terminated and the pressure within the module returns to that of the fuel tank. When the level of fuel in the fuel tank is lower than that within the fuel pump module, a portion of the fuel within the module returns to the fuel tank through the filter of the module thereby dislodging at least some of the contaminants trapped by the filter.

In one form, the module further has a float valve to control the escape of fuel vapor from the module and to prevent the escape of liquid fuel therethrough. Desirably, by venting the fuel pump module to an intake manifold of the vehicle engine or to a carbon fuel vapor collection canister mounted exteriorly of the fuel pump module, the pressure within the fuel pump module is at or near atmospheric pressure when the valve is opened. When disposed within a fuel tank maintained at least slightly above atmospheric pressure, fuel will enter the lower pressure fuel pump module through the filter to fill the module. Alternatively, an engine vacuum signal may be applied to the module to remove fuel vapors from the module and to lower the pressure within the module to draw fuel therein from the surrounding fuel tank.

Desirably, the fuel pump module has an inner cup shaped housing in which the fuel pump is received. The inner housing has a valve which permits liquid fuel to be drawn from the surrounding module into the fuel pump and which prevents the reverse flow of liquid fuel from the inner housing to the outer surrounding fuel module. In use, the pressure drop created by the fuel pump draws fuel into the inner housing from the surrounding module and when the fuel pump operation is terminated, a supply of fuel is maintained within the inner housing to be readily available to the fuel pump when it is restarted. A jet pump may be added within the inner housing and operated by fuel in the fuel pump to further lower the pressure within the inner housing for the purpose of drawing fuel from the module into the inner housing. The fuel pump module filter is preferably generally annular and is carried by a cartridge body to define a lower portion of the module and to provide a large surface area fuel filter with an increased life and to permit fuel within the module to flow back into the fuel tank when the pressure differential between the module and the fuel tank and their corresponding fuel levels permit.

Objects, features and advantages of this invention include providing an improved fuel pump module that extends the useful life of a fuel filter, provides increased fuel filter surface area, improves filtration of fuel, dislodges contaminants from the fuel filter in use, maintains a supply of fuel adjacent the fuel pump inlet even during extremely low level fuel level conditions in the fuel tank, extends the service life of the fuel pump, permits fuel vapors to escape from the fuel pump module, maintains an increased fuel level in the fuel pump module compared to the fuel tank, provides a reduced pressure in the fuel pump module when the vehicle engine is operating, may utilize an engine vacuum signal to draw fuel into the fuel pump module, is durable, reliable, of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
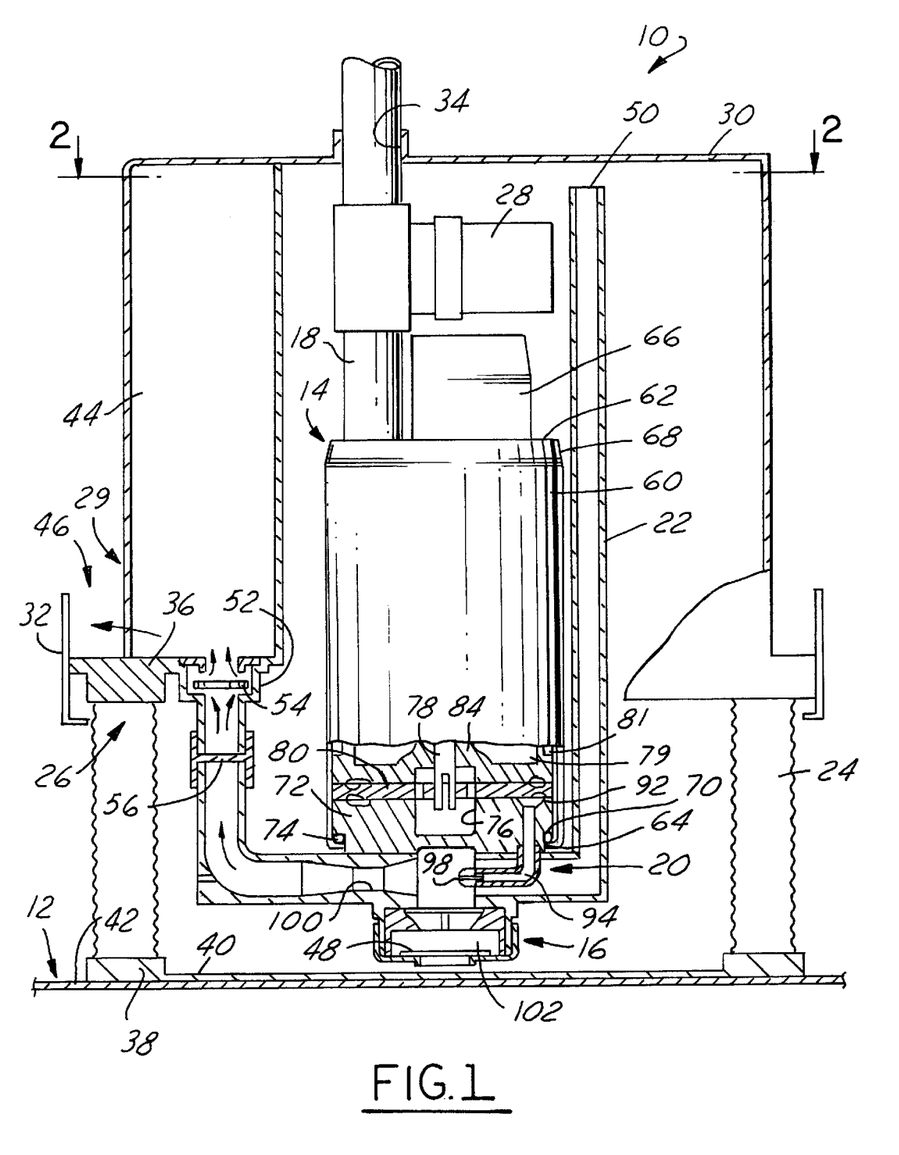
FIG. 1 is a full sectional view of a fuel pump module embodying this invention.
Figure 2:
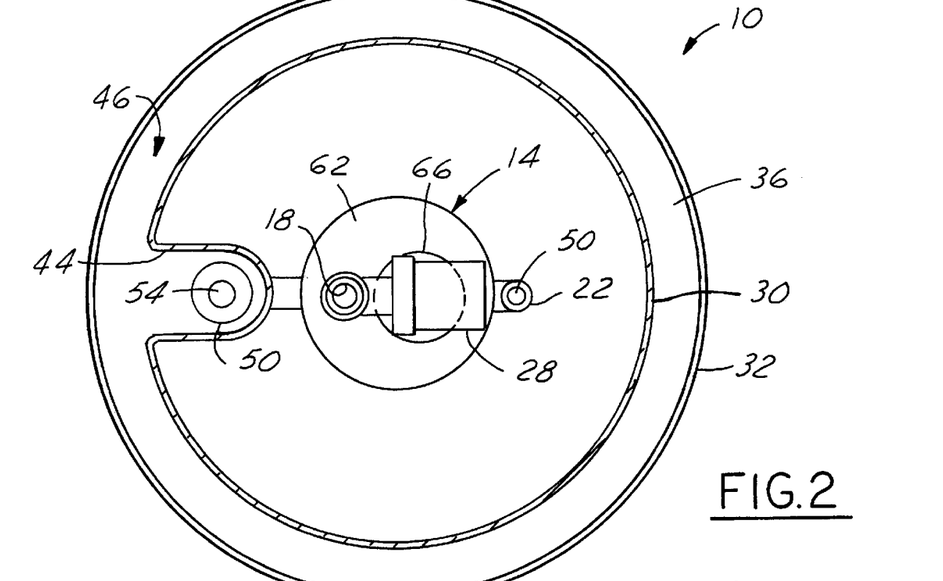
FIG. 2 is a sectional view of the fuel pump module taken generally on line 2—2 of FIG. 1.

Referring in more detail to the drawings, FIG. 1 shows a fuel pump module 10 disposed within a vehicle fuel tank 12 adjacent the bottom of the fuel tank 12. An electric motor fuel pump 14 is received in the module and has an inlet 16 disposed adjacent the bottom of the module 10 to draw fuel from the module 10 and an outlet 18 communicating with a fuel line to deliver fuel under pressure to the vehicle's engine. A jet pump 20 in communication with the fuel pump inlet 16 and received within a stand pipe 22 creates an increased pressure drop within the fuel pump module 10 to draw fuel into the module 10 through an annular filter 24 of a filter cartridge assembly 26 of the module 10 whereupon it may be drawn into the fuel pump 14 for delivery to the engine. A bypass regulator 28 preferably discharges excess fuel delivered from the outlet 18 of the fuel pump 14 into the module 10.

When the fuel pump 14 is not operating such as when the vehicle is not in use, and hence, the jet pump 20 is also not operating, the pressure within the fuel pump module 10 returns to that within the fuel tank 12. When the fuel level in the fuel tank 12 is below that within the module 10, some of the fuel within the module 10 flows back into the fuel tank 12 through the filter 24 thereby dislodging at least a portion of the contaminants trapped by the filter 24 to reduce clogging of the filter 24 and ensure a sufficient fuel flow through the filter 24 when the fuel pump 14 is operating.

The module 10 has a housing 29 which comprises an upper cap 30 secured to the annular filter cartridge 26 by a circumferential band 32. The fuel pump outlet 18 extends through an opening 34 through the cap 30 preferably with a slight interference fit providing a seal so that fuel cannot enter the module through the opening 34. The filter cartridge 26 comprises the annular filter 24 received between an upper ring 36 adjacent the cap 30 and an annular base 38 providing a generally flat lower wall 40 received adjacent the bottom wall 42 of the fuel tank 12.

The cap 30 has a recess 44 which communicates one end of the stand pipe 22 with the fuel tank 12. The band 32 extends slightly above the downstream end of the stand pipe 22 and with the cap 30 and ring 36 forms an annular reservoir 46 which with the recess retains a small amount of fuel. A check valve 48 adjacent the fuel pump inlet 16 prevents the fuel in the stand pipe 22, the recess 44 and reservoir 46 and the fuel pump 14 from flowing out of the fuel pump inlet 16 when the fuel pump 14 is not operating.

The upper end 50 of the stand pipe 22 preferably communicates with the interior of the module 10 generally adjacent to the upper most portion of the cap 30 and a downstream end 52 of the stand pipe 22 preferably communicates with the fuel tank 12 through the recess 44 to discharge fuel into the reservoir 46 and the fuel tank 12. A vent valve 54 is preferably disposed adjacent the downstream end 52 of the stand pipe 22 to permit fuel vapor in the stand pipe 22 to flow into the fuel tank 12. A filter 56 adjacent the downstream end 52 allows vapor to flow therethrough and filters any reverse flow from the tank 12 through the downstream end 52 of the stand pipe 22. Fuel vapor within the fuel pump module is drawn through the upper end 50 of the stand pipe 22 when the jet pump 20 is operating and is discharged through the downstream end 52 of the stand pipe 22 into the fuel tank 12, or a portion of the fuel vapor may be drawn into the fuel pump 14, to remove the fuel vapor from within the fuel pump module 10 and convert it to liquid fuel thereby reducing the quantity of fuel vapor in the system.

Figures 3, 4, 5:
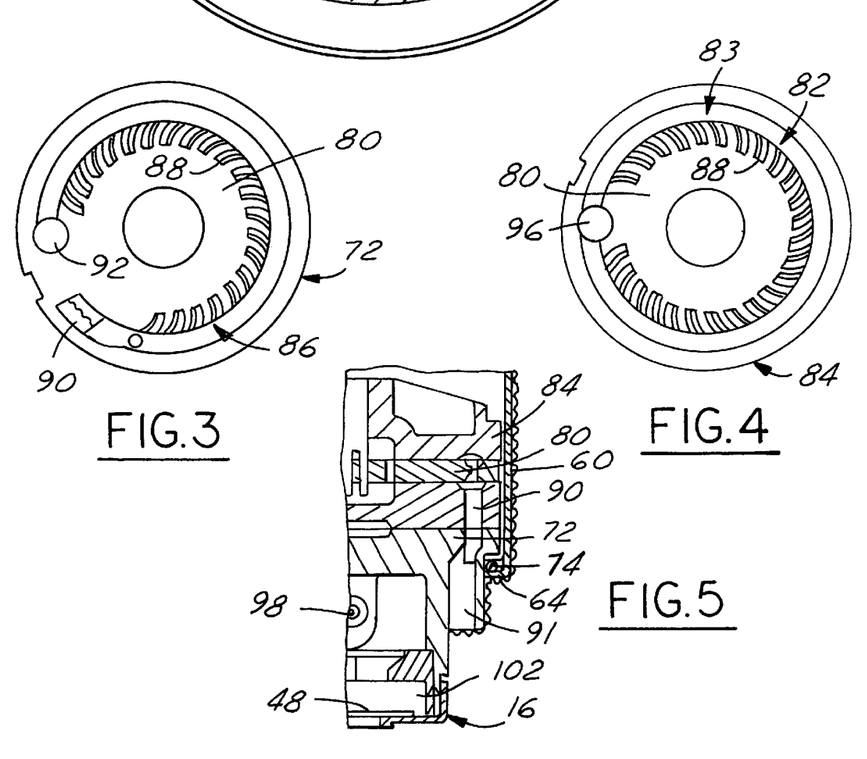
FIG. 3 is a sectional view illustrating a lower pump plate of a turbine element of the fuel pump.
FIG. 4 is a sectional view of an upper pump plate of the fuel pump.
FIG. 5 is a partial sectional view of the fuel pump base and pumping elements.

The fuel pump 14 has a tubular outer shell 60 with a pair of open ends 62, 64 one of which 62 receives an outlet end cap 66 abutting an inwardly extending rim 68 to retain the outlet end cap 66 and the other end 64 receives and is rolled around a circular shoulder 70 formed in a pump base housing 72 with a seal 74 received between them to prevent leakage therethrough. The pump base housing 72 has a cylindrical recess 76 formed therein which partially receives an end of a shaft 78 of an armature 79 received in a stator 81 of the electric drive motor. A turbine pump impeller 80 is driven to rotate with its periphery moving in an annular pumping channel 82 (FIG. 4) formed on one side by an annular channel 83 in a top housing 84 and on the other side by an annular channel 86 (FIG. 3) on the top surface of the pump base housing 72. As shown in FIGS. 3 and 4, in each channel 83, 86, a circumferential array of generally radially oriented grooves 88 are formed extending radially inward respectively from the pumping channels 83, 86. An inlet port 90 is provided in the pump base housing 72 and a pump outlet port 92 in this base 72 opens to a side jet bypass passage 94. In the top housing 84 a main pump outlet passage 96 opens to the armature chamber and to the fuel pump outlet 18. The bypass passage 94 extends into the stand pipe 22 and leads to a jet nozzle 98 which discharges into a venturi 100 formed in the stand pipe 22. The check valve 48 is adjacent a pump fuel inlet chamber 102 and is constructed to admit fuel through the inlet 16 of the fuel pump 14 and prevent the reverse flow of fuel through the inlet 16.

Operation

In use, when the fuel pump 14 is energized, fuel is drawn from the fuel tank 12 through the annular filter 24 and through the inlet 16 of the fuel pump 14 to supply fuel under pressure through the outlet 18 of the fuel pump 14 to the vehicle's engine. A portion of the fuel drawn into the fuel inlet 16 is supplied to the jet bypass passage 94 and is discharged through the jet nozzle 98 and associated venturi 100 downstream of the jet nozzle 98. The flow through the reduced diameter venturi 100 creates a drop in pressure adjacent to the venturi 100 which is communicated with the inlet 16 of the fuel pump 14 and also with the interior of the module 10 via the upper end 50 of the stand pipe 22. The pressure drop in the module 10 draws fuel into the module 10 through the filter 24 and maintains an increased fuel level within the module 10 even during low fuel conditions in the fuel tank 12. The bypass regulator 28 discharges excess fuel into the module 10 which also supplies fuel to the interior of the module to maintain a supply of fuel adjacent to the inlets 16 and 90, 91. Vapor in the upper portion of the module 10 is drawn through the upper end 50 of the stand pipe 22 and is discharged through the downstream end 52 into the fuel tank 12 as described.

When the fuel pump 14 is not operating, and hence is not driving the jet pump 20, such as when the vehicle is not operating, the pressure within the module 10 equalizes with that of the fuel tank 12 and, when the level of fuel in the fuel tank 12 is lower than the level of fuel in the fuel pump module 10, a portion of the fuel in the module 10 will return to the fuel tank 12 through the filter 24 until the fuel levels of the module 10 and fuel tank 12 are equal. This reverse flow through the filter 24 has a washing effect tending to dislodge contaminants from the filter 24 and thereby greatly extending the life of the filter 24 by maintaining it in a relatively clean state. The check valve 48 prevents the fuel within the recess 44, reservoir 46, stand pipe 22 and fuel pump 14 from flowing back through the inlet 16 of the fuel pump 14 thereby keeping the jet pump 20 primed and maintaining a limited supply of fuel at the inlet 16 even during extremely low fuel conditions within the fuel tank 12.

The two-step process of first, drawing fuel into the fuel pump module 10 and second, drawing fuel into the fuel pump 14, and the associated back flow of the fuel out of the fuel pump module 10 and into the fuel tank 12 when the fuel pump 14 is not operating resists excessive build-up of contaminants in the fuel filter 24 and thereby permits a substantially constant maximum fuel flow through the filter 24 throughout its service life. This provides sufficient fuel at the inlets 16 and 90, 91 of the fuel pump 14 which extends the life of the fuel pump 14 and allows the fuel pump 14 to supply sufficient fuel to the engine for its steady and consistent operation.

Second Embodiment

Figure 6:
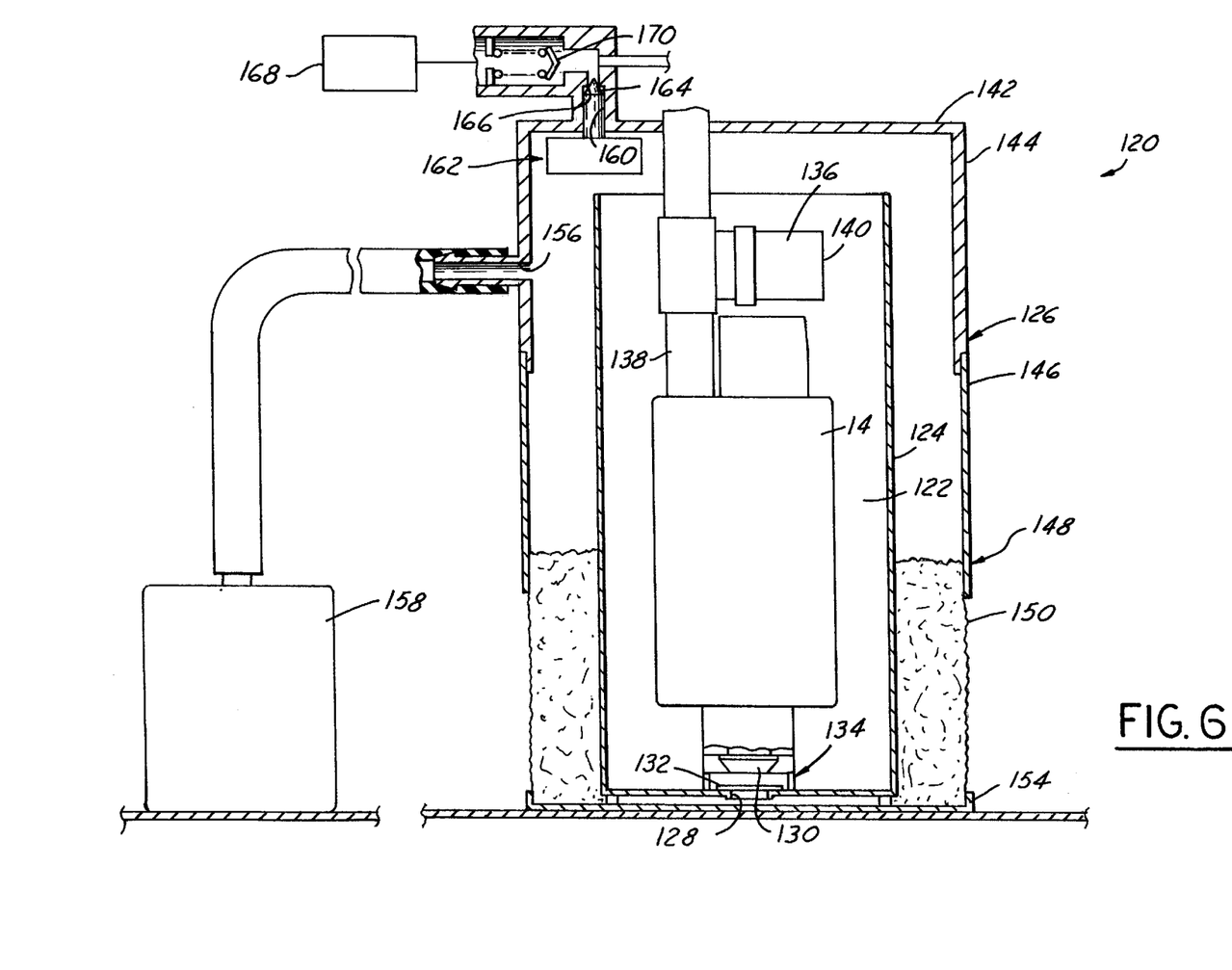
FIG. 6 is a sectional view of a modified fuel pump module according to a second embodiment of the invention.

FIG. 6 illustrates a second embodiment of the fuel pump module 120 wherein the electric motor driven fuel pump 14 is disposed within a reservoir 122 defined by a cup-shaped inner housing 124 received within a fuel pump module housing 126. The inner housing 124 has a bottom wall with an opening 128 through which fuel is drawn into the inner housing 124 to be subsequently drawn into the fuel pump for subsequent discharge under pressure from the fuel pump 14 and delivery to an engine. The fuel pump 14 has a first inlet 130 communicating with the opening 128 through a foot valve 132 and a second inlet or inlets 134 through which fuel is drawn into the fuel pump 14 from the inner housing 124. A fuel pressure regulator 136 has an inlet in communication with the outlet 138 of the fuel pump 14 and has a bypass outlet 140 preferably within the inner housing 124 to bypass fuel delivered in excess of the engine's fuel demand to the reservoir 122 of the inner housing 124. To permit fuel to overflow from the inner housing 124 back into the fuel pump module housing 126, the upper end of the inner housing 124 is preferably open to the interior of the fuel pump module housing 126. To maintain a supply of fuel within the inner housing 124, the foot valve 132 prevents the flow of fuel out of the inner housing 124 through the opening 128 while permitting the reverse fuel flow into the inner housing 124 through the opening 128.

The fuel pump module housing 126 has an upper cap 142 with a depending generally cylindrical side wall 144 press-fit or snap fit onto a generally cylindrical side wall 146 of a filter cartridge 148. The filter cartridge 148 has an annular generally cylindrical fuel filter 150 carried between the sidewall and a lower wall 154. The lower wall 154 closes the bottom of the filter 150 and defines a bottom wall of the module 120. The fuel pump module housing is constructed to rest on the bottom of the fuel tank 12 and may be biased by springs (not shown) to ensure that it bears on the bottom of the fuel tank 12 and to permit it to be used within fuel tanks of different depths.

An opening 156 through the upper cap sidewall 144 may communicate with a fuel reservoir 158 or with a different section of a saddle type tank to permit liquid fuel to be exchanged between the fuel tank 12 and reservoir 158 or another section of a saddle tank. For example, when the level of fuel in the fuel pump module housing 126 reaches the opening 156, fuel may flow to the reservoir 158 if the reservoir 158 has a lower fuel level to tend to equalize the fuel levels of the reservoir 158 and fuel tank 12. Fuel may flow from the reservoir 158 to the housing 126 when its fuel level is above a certain level or in response to a low pressure in the housing 126.

A fuel vapor outlet 160 in the upper cap 142 is selectively communicated with the interior of the fuel pump module housing 126 by a float valve 162 carried by the fuel pump module housing 126 and responsive to the level of fuel therein. To prevent liquid fuel from escaping from the housing 126, the float valve 162 has a valve head 164 engageable with a valve seat 166 of the fuel pump module housing 126 to close off the fuel vapor outlet 160 when the level of fuel in the fuel pump module housing raises the buoyant float valve 162 to engage the seat 166. When the level of fuel in the fuel pump module housing 126 does not cause the float valve head 164 to engage the seat 166, fuel vapor within the module housing 126 may flow out of the module through the fuel vapor outlet 160 and to a fuel vapor canister 168 of preferably generally conventional construction. A check valve 170 between the fuel vapor outlet 160 and the fuel vapor canister 168 prevents the reverse flow of fuel vapor from the canister 168 to the module 120.

The vapor canister 168 is communicated with an engine air intake manifold and is usually maintained at a lower pressure than the fuel tank 12 which is generally at a slightly superatmospheric pressure. Thus, when the float valve 162 is open and the fuel pump module housing 126 is vented to the vapor canister 168, the pressure in the module 120 is lowered relative to the fuel tank 12 pressure to draw fuel from the fuel tank into the housing 126 through the filter 150. Thus, the fuel pump module may be used without a jet pump to draw fuel into the fuel pump module housing.

Figure 7:
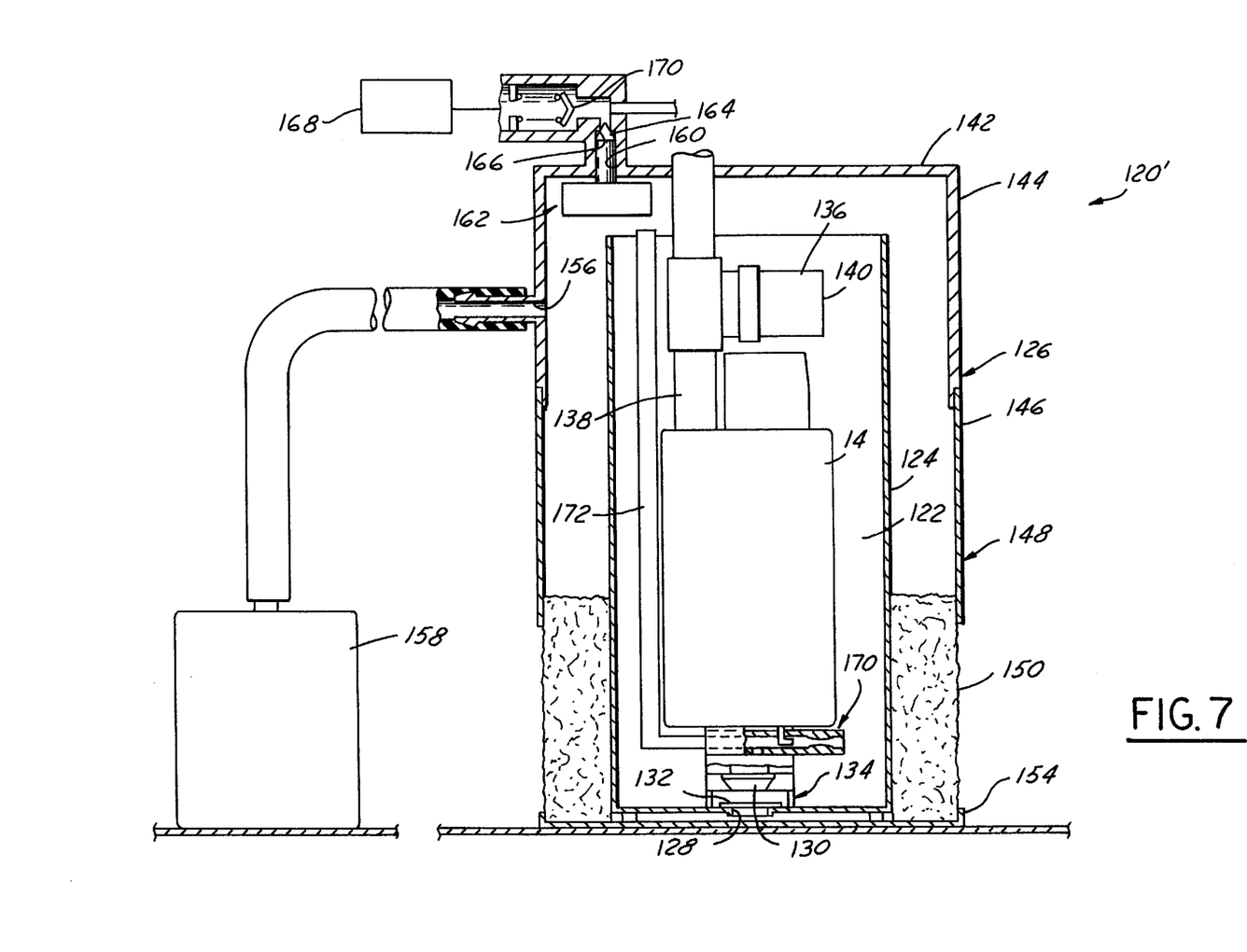
FIG. 7 is a sectional view of a modified fuel pump module as in FIG. 6 and including a jet pump.

Alternatively, as shown in FIG. 7, a modified module 120' has a jet pump 170 driven by a portion of the outlet fuel from the fuel pump 14 to create a pressure drop within the fuel pump module housing 126 to draw fuel into the housing 126 through the fuel filter 150 and supply fuel to the inlet of the fuel pump 14. To reduce the amount of fuel vapor within the module 120', a conduit 172 may be provided communicating the upper most portion of the interior of the fuel pump module housing 126 with the jet pump 170 so that the jet pump 170 draws fuel vapor from within the module and combines this fuel vapor with liquid fuel in the inner housing 124 upon discharge from the jet pump 170 to condense at least some of the fuel vapor back into liquid fuel. This module 120' may be otherwise constructed in the same manner as the module 120 described earlier. Hence, its construction and operation will not be further described.

Thus, according to a second embodiment of the invention, fuel may be drawn into the fuel pump module 120, 120' by either a jet pump 170 or by venting the fuel pump module 120 to a lower pressure source such as the vapor canister 168 to lower the pressure of the fuel pump module 120, 120' relative to the surrounding fuel tank 12. Additionally, the inner, cup-shaped housing 124 maintains a supply of fuel at the fuel pump inlet 134 even during extremely low fuel level conditions in the surrounding fuel tank 12 to ensure that a supply of fuel is available for the fuel pump 14 to deliver to the engine. As in the first embodiment, the large surface area, annular filter 150 has a long life in use and resists becoming excessively clogged or dirty due to its large surface area and the flow of fuel out of the fuel pump module housing 126 and into the fuel tank 12 when the low pressure source within the fuel pump module 120, 120' is terminated and the fuel level within the surrounding fuel tank is lower than that in the fuel pump module as described with regard to the first embodiment.

Third Embodiment

Figure 8:
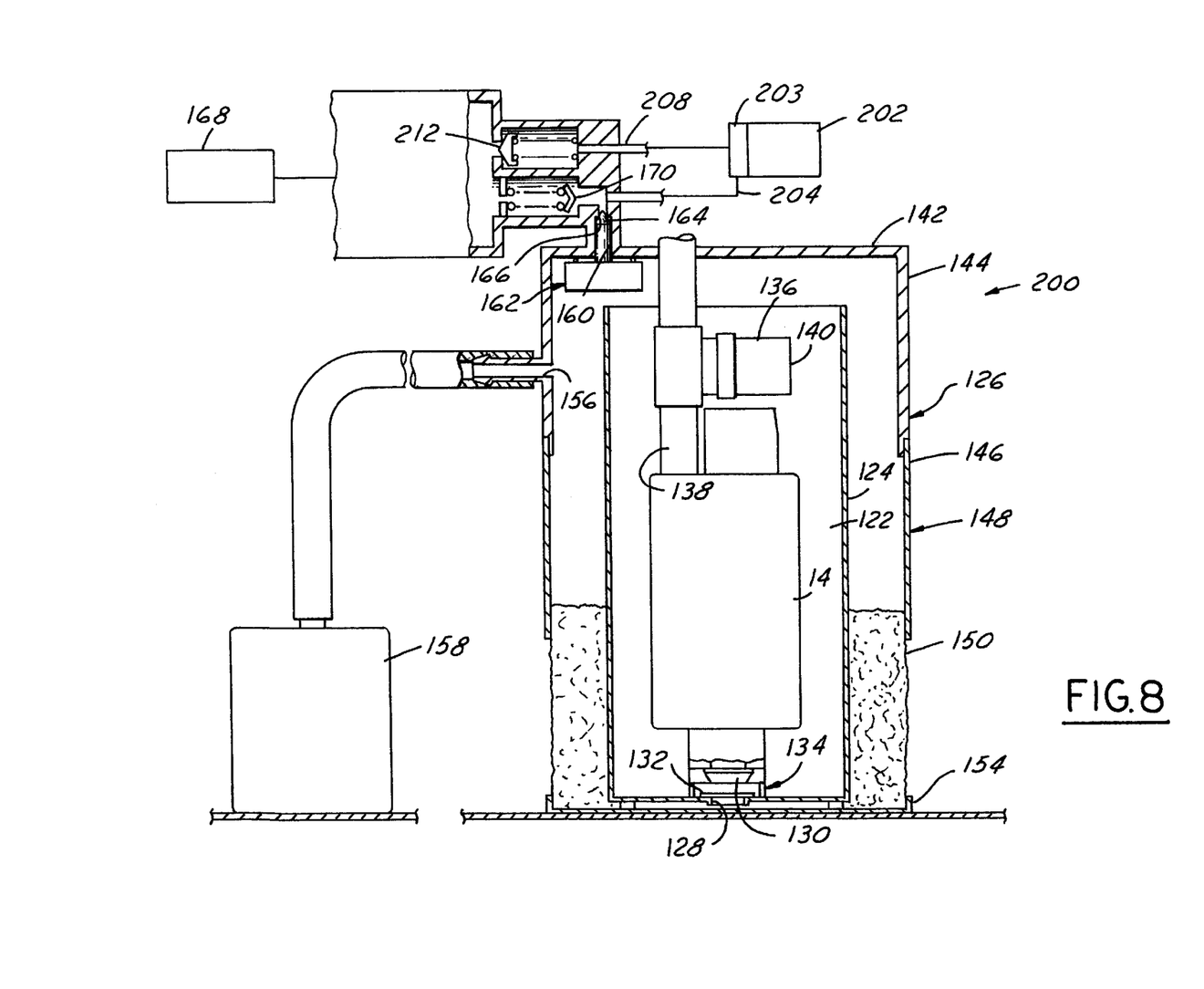
FIG. 8 is a sectional view of a modified fuel pump module according to a third embodiment of the invention.

FIG. 8 illustrates a third embodiment fuel pump module 200 which is constructed substantially the same as the second embodiment fuel pump module 120 and the same parts have been given the same reference numbers to facilitate description of this module 200. In some current fuel systems, the fuel vapor storage canister 168 is being located in closer proximity to the fuel tank 12 then in older fuel systems. Thus, a subatmospheric (negative) pressure from the engine 202, used to purge the fuel vapor canister 168 by drawing vapor and air out of the canister 168 and into an intake manifold 203 of the engine 202, is also available in closer proximity to the fuel tank 12. Advantageously, this negative pressure signal from the engine 202 may be used to decrease the pressure within the fuel pump module 200 relative to the surrounding fuel tank 12 to draw fuel into the fuel pump module 200. Such an arrangement is diagrammatically illustrated in FIG. 8 wherein an engine pressure conduit 204 communicates with the fuel vapor outlet 160 of the fuel pump module housing 126 to decrease the pressure within the fuel pump module housing 126 when the float valve 162 is open. Desirably, fuel vapor drawn out of the fuel pump module housing 126 flows through a check valve 170 and into the fuel vapor canister 168 as in the second embodiment. A conduit 208 communicates the fuel vapor canister 168 with an intake manifold 203 of the engine 202 through a check valve 212 which prevents a reverse flow of fluid from the intake manifold 203 to the vapor canister 168.

Thus, the low pressure or negative pressure signal from the engine 202 is utilized to reduce the pressure in the fuel pump module 200 to draw fuel from the fuel tank 12 into the fuel pump module 200. In addition, with the float valve 162 open, the module 200 is preferably also vented to the fuel vapor canister 168 as in the second embodiment. This also lowers the pressure in the module 200 compared to the pressure in the fuel tank 12 to draw fuel into the module 200. The rest of the fuel pump module 200 functions in substantially the same manner as the second embodiment fuel pump module 120 and hence, its operation will not be further described.

What is claimed is:

1. A fuel pump module constructed to be disposed interiorly of a vehicle fuel tank comprising:

an electric motor fuel pump having an inlet and an outlet;

a housing enclosing the fuel pump and having at least one inlet through which fuel flows from the fuel tank into the housing;

a secondary pump with an inlet within the housing to lower the pressure within the housing below the pressure outside of the housing and within the fuel tank and an outlet to the exterior of the housing and within the tank; and at least one filter enclosing the inlet of the housing whereby the fuel pump draws fuel into the housing through the filter and the secondary pump creates a pressure drop within the housing lower than the pressure outside the housing and within the tank and increasing the fuel level therein when the fuel pump is operating and when the fuel pump ceases operating and the level of fuel in the tank is below the increased level of fuel in the housing, fuel in the housing returns to the tank through the filter, at least under certain fuel conditions, thereby dislodging at least some contaminants from the filter.

2. The fuel pump module of claim 1 wherein the housing comprises an upper cap received on an annular filter cartridge and the inlet of the housing is defined by the annular filter cartridge.

3. The fuel pump module of claim 1 which also comprises a stand pipe disposed in the module in communication with an upper portion of the interior of the fuel pump module at one end and with the fuel tank at its other end and communicated between its ends with the inlet and outlet of the secondary pump.

4. The fuel pump module of claim 3 wherein the secondary pump is a jet pump with a nozzle through which fuel is discharged to a reduced diameter orifice downstream of the nozzle creating a pressure drop adjacent the orifice and communicated with the interior of the fuel pump module through the stand pipe.

5. The fuel pump module of claim 4 wherein the jet pump is disposed adjacent the fuel pump inlet to draw fuel therethrough.

6. The fuel pump module of claim 1 also comprising a valve adjacent the fuel pump inlet and constructed to prevent the reverse flow of fuel from the fuel pump inlet.

7. The fuel pump module of claim 1 wherein the housing is generally cylindrical and the inlet of the housing is a plurality of circumferentially spaced openings each enclosed by a single filter.

8. The fuel pump module of claim 1 also comprising a passage generally adjacent the fuel pump outlet through which excess fuel delivered from the fuel pump is discharged into the module.

9. The fuel pump module of claim 1 wherein fuel vapor within the housing is communicated with the fuel tank through the outlet of the secondary pump.

10. The fuel pump module of claim 1 wherein the filter is annular and disposed surrounding the fuel pump module and covering each of its inlets.

11. The fuel pump module of claim 5 which also comprises a check valve adjacent the fuel pump inlet and constructed to prevent the reverse flow of fuel from the fuel pump inlet to maintain fuel in the stand pipe and within the fuel pump when the fuel pump is not operating.

12. A fuel pump module constructed to be disposed interiorly of a vehicle fuel tank comprising:

an electric motor fuel pump having an inlet and an outlet;

a housing enclosing the fuel pump and having at least one inlet through which fuel flows from the fuel tank into the housing;

a secondary pump within the housing to lower the pressure within the housing;

a stand pipe disposed in the housing in communication with an upper portion of the interior of the housing at one end and with the fuel tank at its other end and communicating between its ends with the secondary pump, the secondary pump being a jet pump with a fuel inlet and a nozzle through which fuel is discharged to a reduced diameter orifice downstream of the nozzle creating a pressure drop adjacent the orifice and communicating with the interior of the fuel pump module through the stand pipe, and the jet pump fuel inlet is disposed adjacent the fuel pump inlet to draw fuel therethrough;

a check valve adjacent the jet pump fuel inlet and constructed to prevent the reverse flow of fuel from the jet pump inlet to maintain fuel in the stand pipe and within the jet pump when the jet pump is not operating; and at least one filter enclosing the inlet of the housing whereby the fuel pump draws fuel into the housing through the filter and the secondary pump creates a pressure drop within the housing increasing the fuel level therein when the fuel pump is operating, and when the fuel pump is not operating, fuel in the housing returns to the tank through the filter, at least under certain fuel conditions, thereby dislodging at least some contaminants from the filter.

13. A fuel pump module constructed to be disposed within a vehicle fuel tank, comprising:

an electric motor fuel pump;

a housing which carries the fuel pump and has at least one inlet through which fuel flows from the fuel tank into the housing;

a secondary low pressure source located outside of the housing, at a lower pressure than the fuel tank and communicating with the interior of the housing to reduce the pressure in the interior of the housing below the pressure of the fuel tank; and at least one filter enclosing the housing inlet whereby when communicated with the housing, the secondary low pressure source creates a pressure drop in the housing relative to the fuel tank to draw fuel into the housing through the filter.

14. The fuel pump module of claim 13 which also comprises an opening through the housing communicating the interior of the housing with the secondary low pressure source and a valve carried by the housing to control fluid flow through the opening.

15. The fuel pump module of claim 14 which also comprises a valve seat carried by the housing and wherein the valve comprises a float buoyant in liquid fuel and having a head engageable with the valve seat to close the housing opening.

16. The fuel pump module of claim 14 wherein the secondary low pressure source includes a fuel vapor canister maintained at a lower pressure then the fuel tank.

17. The fuel pump module of claim 14 wherein the opening in the housing is adapted to communicate with a subatmospheric pressure from the vehicle engine.

18. The fuel pump module of claim 13 which also comprises an inner housing disposed within the module housing, defining a reservoir in which the fuel pump is received and having an inlet through which fuel is drawn into the inner housing from the module housing.

19. The fuel pump module of claim 18 which also comprises a valve at the inlet to the inner housing which permits fuel to enter the inner housing through its inlet but prevents the reverse flow of fuel out of the inner housing through its inlet.

20. The fuel pump module of claim 18 wherein the inner housing is open at one end to the interior of the module housing to permit fuel to overflow out of the inner housing and into the module housing.

21. The fuel pump module of claim 13 which also comprises a fuel transfer opening formed in the module housing adapted to communicate the interior of the module housing with the interior of another fuel reservoir to permit fuel flow between them under at least some fuel level conditions.

22. The fuel pump module of claim 18 which also comprises a fuel pressure regulator having an inlet in communication with the fuel pump outlet and an outlet which bypasses excess fuel delivered from the fuel pump into the inner housing.

* * * * *